Oct. 11, 1949.           H. HAVRENIUS           2,484,031
                            DRAIN TRAP
                         Filed June 1, 1944
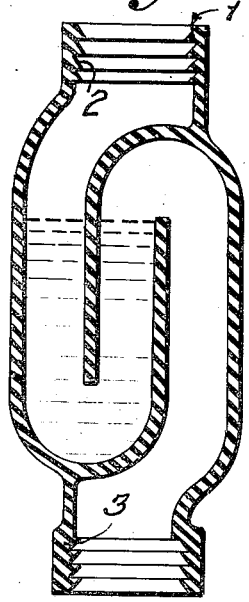
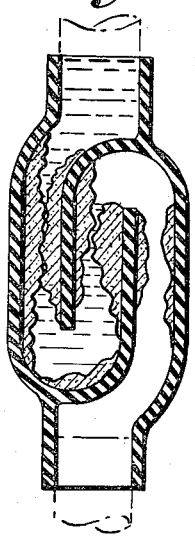  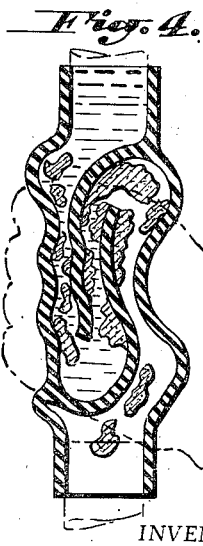
INVENTOR.
Hilding Havrenius
BY
Henry C. Parker
Attorney.

Patented Oct. 11, 1949

2,484,031

UNITED STATES PATENT OFFICE 2,484,031

DRAIN TRAP

Hilding Havrenius, Jonkoping, Sweden

Application June 1, 1944, Serial No. 538,259
In Sweden March 10, 1943

7 Claims. (Cl. 182—7)

1

The present invention has for its object a water seal or trap for drain pipes leading from wash basins, kitchen-sinks and similar installations. The object of such a trap is, as known, to prevent obnoxious gases to penetrate into the house from the sewer. This is realized by giving the trap channel an S-shaped bend, so that a receptacle is formed in which part of the water that flows through the pipe is retained. The water-surface is here divided by a depending partition-wall which together with the water in the bend forms an ostruction for gases in the drain pipe.

A well known disadvantage of present traps is the fact that they frequently become clogged by dirt which accumulates in the trap. This is particularly the case with traps having a narrow passage and which are subject to contamination by fat and slimy substances, such as traps on kitchen sinks, lavatories and the like. The impurities form gradually increasing deposits on the inner-wall of the trap so that the water passage is finally more or less completely obstructed. For this reason it is necessary from time to time to unscrew the rinse-stoppers which are provided on the trap and which furthermore are often difficult to remove on account of sticking due to corrosion, in order to empty the trap from its contents. The ill-smelling gases are hereby permitted to freely escape from the sewer into the room while the unhygienic rinsing of the trap is carried out, using bent or flexible metal wires or similar unhandy instruments. The use of corrosive chemicals for the same purpose often presents great dangers to the unskilled persons mostly employing them in the homes.

The present invention aims to remove the tedious, unhygienic and expensive disadvantages connected with the rinsing of present day drain traps, and to limit the rinsing operation to such a simple measure that it may without the slightest difficulty be carried out by any person.

Hitherto known drain traps are of a completly rigid structure. The traps are as a rule made of cast iron or some other metal. According to the present invention the trap is instead made elastic, so that it may be deformed and will again resume its original form after the deformation. The trap may, e. g., be entirely made of rubber, so that the walls can be deformed by being squeezed or pressed. By this temporary change of the cross section of the trap the deposits are caused to detach and are broken up by the working and pumping action brought about, so that they will afterwards be easily flushed out

2 by the water passing through the pipe. My trap is constructed with a hollow receptacle of generally tubular shape, an inlet socket member and an outlet socket member connected with said receptacle and an inner depending wall serving to partition the interior of said receptacle into a downwardly extending passageway and an upwardly extending passageway, said passageways being in open communication at their lower ends to form a water seal and a continuous passageway connecting said inlet socket member with said outlet socket member, said receptacle being constructed of a plastic elastic material which is sufficiently resilient to yield to deformation by the hand so that slime and other matter precipitated inside said trap may be loosened therefrom by squeezing the receptacle by hand so as to temporarily deform the same.

In the accompanying drawing there is shown more or less diagrammatically an operative embodiment of the invention.

Fig. 1 is a vertical section of a drain trap of the usual type but built of elastic material, e. g., rubber. Rinse plugs are omitted since they are superfluous under these circumstances.

Figs. 2, 3 and 4 are intended to explain the way in which the trap according to the invention functions in respect to the rinsing of the same.

Fig. 2 is a vertical section of a rubber trap which has become clogged. Fig. 3 shows the manner in which the trap is squeezed by the hand and Fig. 4 shows the way in which the clogging contents of the trap are broken up by this squeezing. When the squeezing ceases the trap will resume its original form, e. g., as in Fig. 1.

In order to facilitate the connecting of the trap to the drain pipe and to improve the fitting so as to prevent leakage, the inner edges of the sockets shown generally at 1 are suitably provided with inwardly projecting annular ribs 2 and a shoulder 3, as shown in Fig. 1. The ribs in the sockets are adapted to fit over and to grip the ends of a drain pipe.

As already mentioned, the trap is suitably made of an elastic material which may be easily deformed by the hand, e. g., soft, elastic rubber. The trap may, in this case, with particular advantage be made of a multiply material of this character, e. g., in such a manner that the inner wall consists of a particularly resistant rubber of special quality or of a plastic or elastic synthetic resin or the like, which is capable of withstanding attacks from alkali, acids or other corrosive and abrasive substances, whereas the outer ply or plies suitably consist of canvas, wire netting or the like, embedded in elastic rubber or other suitable elastic material.

I claim:

1. A trap for drain pipes and the like which comprises a hollow receptacle of generally tubular shape, an inlet socket member and an outlet socket member connected with said receptacle and an inner depending wall serving to partition the interior of said receptacle into a downwardly extending passageway and an upwardly extending passageway, said passageways being in open communication at their lower ends to form a pocket adapted to hold a water seal and to form a continuous passageway connecting said inlet socket member with said outlet socket member, said trap being adapted to be connected in the drain pipes of sinks and the like, said receptacle being constructed of an elastic plastic material which is sufficiently resilient to yield to deformation by the hand so that slime and other matter precipitated inside said trap may be loosened therefrom by squeezing the receptacle by hand so as to temporarily deform the same.

2. The trap of claim 1 wherein said inner depending wall is also constructed of said elastic plastic material.

3. The trap of claim 1 wherein said socket members and said inner depending wall are constructed of said elastic plastic material and integral with said receptacle.

4. The trap of claim 1 wherein said receptacle is formed from several plies, one of which is a flexible woven material.

5. The trap of claim 1 wherein said elastic plastic material is rubber.

6. In a water trap for drain pipes and the like, a receptacle having a tubular outer wall of elastic plastic material, said receptacle being provided with inlet and outlet socket members for attaching the same to a conduit for liquids so as to form part thereof, an interior baffle wall depending from the upper portion of the receptacle wall adjacent the inlet socket member of said receptacle, said baffle wall together with the receptacle wall forming a pocket for holding a liquid seal in which the baffle contacts the liquid with both surfaces, said receptacle and baffle being sufficiently resilient to yield to deformation by the hand so that slime and other precipitate on the surfaces of said baffle and receptacle which contact the liquid seal may be loosened therefrom by squeezing the water seal by hand so as to temporarily deform the same.

7. A trap for the drain pipes of sinks and the like which comprises a hollow, flexible receptacle of generally tubular shape, flexible inlet and outlet socket members integral with said receptacle and provided with interior annular ribs adapted to fit over and to grip the ends of a metal drain pipe, an inner depending wall serving to partition the interior of said receptacle into a downwardly extending passageway and an upwardly extending passageway, said passageways being in open communication at their lower ends to form a pocket adapted to hold a water seal and to form a continuous passageway connecting said inlet socket member with said outlet socket member, said receptacle being constructed of an elastic plastic material which is sufficiently resilient so that the receptacle can be squeezed and deformed by the hand and operated with a pumping action to loosen and eliminate slime and other matter precipitated within said trap without removal of the trap from the drain pipe.

HILDING HAVRENIUS.

REFERENCES CITED

The following references are of record in the file of this patent:

UNITED STATES PATENTS

| Number | Name | Date |
| --- | --- | --- |
| 178,059 | Hutchins | May 30, 1876 |
| 1,640,600 | Crosby | Aug. 30, 1927 |

FOREIGN PATENTS

| Number | Country | Date |
| --- | --- | --- |
| 53,505 | Austria | May 10, 1912 |
| 131,864 | Germany | 1902 |
| 405,971 | Great Britain | Feb. 5, 1934 |